(12) United States Patent
Neelakantan et al.

(10) Patent No.: US 10,571,023 B2
(45) Date of Patent: Feb. 25, 2020

(54) VEHICLE PARK SYSTEM AND METHOD FOR SHIFT OUT OF PARK ASSIST

(71) Applicant: GM Global Technology Operations LLC, Detroit, MI (US)

(72) Inventors: Vijay A. Neelakantan, Rochester Hills, MI (US); Marc H. Sullivan, White Lake Township, MI (US); Lawrence A. Kaminsky, White Lake, MI (US)

(73) Assignee: GM Global Technology Operations LLC, Detroit, MI (US)

(*) Notice: Subject to any disclaimer, the term of this patent is extended or adjusted under 35 U.S.C. 154(b) by 28 days.

(21) Appl. No.: 16/043,864

(22) Filed: Jul. 24, 2018

(65) Prior Publication Data

US 2020/0032902 A1  Jan. 30, 2020

(51) Int. Cl.
*B60W 10/08* (2006.01)
*F16H 63/34* (2006.01)
*B60W 10/18* (2012.01)

(52) U.S. Cl.
CPC ......... *F16H 63/3483* (2013.01); *B60W 10/08* (2013.01); *B60W 10/182* (2013.01); *F16H 63/3433* (2013.01)

(58) Field of Classification Search
None
See application file for complete search history.

(56) References Cited

U.S. PATENT DOCUMENTS

| | | | |
|---|---|---|---|
| 5,807,205 A * | 9/1998 | Odaka | B60L 7/00 477/20 |
| 8,840,506 B2 * | 9/2014 | Schwekutsch | B60T 13/746 180/65.6 |
| 9,145,113 B2 | 9/2015 | Landino et al. | |
| 9,399,454 B2 | 7/2016 | Somerville et al. | |
| 9,434,370 B2 * | 9/2016 | Nishikawa | B60K 6/365 |
| 10,023,191 B2 * | 7/2018 | Fontvieille | B60W 10/08 |
| 2008/0051252 A1 * | 2/2008 | Nishimura | B60T 1/005 477/92 |
| 2013/0184906 A1 * | 7/2013 | Harper | B60L 15/2018 701/22 |
| 2013/0305863 A1 * | 11/2013 | Weslati | F16H 63/48 74/411.5 |
| 2018/0043895 A1 | 2/2018 | Shami et al. | |
| 2019/0299977 A1 * | 10/2019 | Manivasagam | F16H 63/3425 |

FOREIGN PATENT DOCUMENTS

DE  102009023498 B4  9/2016
DE  102017124499 A1  4/2018

* cited by examiner

*Primary Examiner* — Dirk Wright (74) *Attorney, Agent, or Firm* — Quinn IP Law (57) ABSTRACT

A method of controlling a vehicle park system in a shift out of park includes receiving a shift out of park request, and commanding a park actuator to rotate an actuator shaft operatively connected to a park pawl movable from an engaged position in which the park pawl is engaged with a park gear, to a disengaged position in which the park pawl is disengaged from the park gear. The method includes determining whether a detent lever operatively connected to the park pawl has moved towards an out of park position within a predetermined period of time after commanding the park actuator to rotate the actuator shaft, and then commanding an electric propulsion motor to apply torque to the transmission output shaft to assist the park actuator if the detent lever has not moved towards the out of park position within the predetermined period of time.

20 Claims, 6 Drawing Sheets

VEHICLE PARK SYSTEM AND METHOD FOR SHIFT OUT OF PARK ASSIST

INTRODUCTION

The present disclosure relates to a method of controlling a vehicle shift out of park, and a vehicle park system controllable according to the method.

When a vehicle is placed in a park state, a vehicle park system may place a park pawl into engagement with a park gear mounted to the output shaft to prevent the rotation of the output shaft and components connected thereto, such as the vehicle wheels, especially when the vehicle is parked on a grade. Some vehicles have an electric park brake (EPB) system that prevents rotation of the vehicle wheels when the vehicle is placed into the park state. The EPB system may brake the wheels prior to park pawl engagement, in which case the park pawl will not be loaded by the park gear even with the vehicle on a grade. Without the EPB system, however, the park pawl could become loaded by the park gear, with the magnitude of the load dependent upon the grade on which the vehicle is parked and the gross vehicle weight. Accordingly, in a robust design able to accomplish a shift out of park as a backup to the EPB system, a park actuator used to disengage the park pawl from the park gear is sized for the largest loads on the park pawl that may occur, such as when the vehicle is at a maximum gross vehicle weight and is parked on a steep grade. Although park actuators designed for the maximum gross vehicle weight and the relatively steep grade are suitable for their intended purposes, they have relatively large packaging space requirements and relatively high cost in comparison to a smaller actuator designed for lower weights. Additionally, a proliferation of different actuator sizes and designs for different vehicle applications may result when park actuators are designed in this manner.

SUMMARY

A method of controlling a vehicle shift out of park overcomes these issues by utilizing an electric propulsion motor to assist the park actuator in unloading the park pawl under certain operating parameters. This may enable the use of smaller and/or more universal park actuators across vehicles of different gross vehicle weights.

A method of controlling a vehicle park system in a shift out of park is carried out by an electronic controller on a vehicle that has an electric propulsion motor connectable with a transmission output shaft. The method comprises receiving a shift out of park request, and commanding a park actuator to rotate an actuator shaft. A detent lever is mounted on the actuator shaft and is operatively connected to a park pawl. The detent lever is movable from a park position to an out of park position. In the park position of the detent lever, the park pawl is in an engaged position and is engaged with a park gear mounted on the transmission output shaft. In the out of park position of the detent lever, the park pawl is in a park position and is disengaged from the park gear. The method includes determining whether the detent lever has moved towards the out of park position within a predetermined period of time after commanding the park actuator to rotate the actuator shaft, and then commanding the electric propulsion motor to apply torque to the transmission output shaft to assist the park actuator with unloading the park pawl if the detent lever has not moved towards the out of park position within the predetermined period of time.

In an aspect, the method may further comprise estimating a grade on which the vehicle is parked. Commanding the electric propulsion motor to apply the torque on the output shaft may include commanding a direction of torque and a magnitude of torque based on the grade as estimated. The magnitude of the grade may be estimated based on an inertial measurement unit sensor signal, such as from an inertial measurement unit that may be present on the vehicle to determine changes in longitudinal or angular acceleration of the vehicle. The inertial measurement unit sensor signal is indicative of the direction of grade (i.e., whether the vehicle is parked on a downgrade with the front wheels downhill of the rear wheels or on an upgrade with the front wheels uphill of the rear wheels).

In an aspect, estimating the grade may include accessing stored data indicative of a direction of vehicle roll occurring during or after a last preceding shift to park event. For example, the method may comprise determining rotational direction and speed of the electric propulsion motor after the park pawl is engaged with the park gear in the last preceding shift to park event, as this is indicative of the vehicle loading of the park pawl as a result of vehicle grade, and hence the direction of torque required to unload the park pawl. The direction of vehicle roll during or after the last preceding shift to park event is thus stored, and is accessed and used by the controller to estimate the grade in the subsequent shift out of park event.

Additionally, commanding the electric propulsion motor to apply the torque to the output shaft may include ramping the torque applied to the output shaft up to the magnitude of torque based on the grade as estimated. The electric propulsion motor assists the park actuator, and the method may ensure that torque from the electric propulsion motor is ramped to the magnitude determined as necessary to unload the park pawl, and then is commanded to zero torque, allowing the actuator to complete the shift out of park. This avoids a jerky or noisy transition to the out of park state.

In an aspect, the method may further comprise monitoring angular movement of the actuator shaft, and commanding zero torque of the electric propulsion motor so that it no longer applies torque to the transmission output shaft when the actuator shaft has moved a first predetermined angular amount. Angular movement of the actuator shaft is the same as angular movement of the park detent lever, so monitoring angular movement of the actuator shaft may be accomplished by monitoring angular movement of the actuator shaft or of the park detent lever. For example, angular movement of the first predetermined amount may be enough to unload the park pawl, and then the park actuator may remain on to complete the stroke of the actuator, moving the park pawl to the disengaged position.

The method may include commanding the park actuator off when the actuator shaft has moved a second predetermined angular amount corresponding with the disengaged position of the park pawl. The second predetermined angular amount is greater than the first predetermined angular amount. For example, the first predetermined angular amount may be but is not limited to 5 degrees, and the second predetermined angular amount may be but is not limited to 45 degrees.

Once the park pawl is in the disengaged position, the method may further include commanding release of vehicle brake hydraulic pressure (if not requested by the driver), and may include commanding release of an electronic parking brake, if on, although the electronic park brake may or may not have been on while unloading and disengagement of the park pawl, as the method may be carried out as a backup to the EPB system.

Within the scope of the disclosure, a vehicle park system for a vehicle with a transmission output shaft and an electric propulsion motor connectable with the transmission output shaft includes a park gear mounted on the transmission output shaft, and a park pawl movable from an engaged position in which the park pawl is engaged with the park gear to a disengaged position in which the park pawl is disengaged from the park gear. The vehicle park system includes a park actuator having an actuator shaft, a detent lever mounted on the actuator shaft and operatively connected to the park pawl. The park actuator is configured to rotate the actuator shaft to move the detent lever and hence the park pawl. The park system includes an electronic controller operatively connected to the park actuator and the electric propulsion motor. In response to receiving a shift out-of-park request, the electronic controller is configured to: command the park actuator to rotate the actuator shaft; determine whether the detent lever has moved towards an out of park position (in which the park pawl is in a corresponding disengaged position) within a predetermined period of time after commanding the park actuator to rotate the actuator shaft; and command the electric propulsion motor to apply torque to the transmission output shaft to assist the park actuator with unloading the park pawl if the detent lever has not moved towards the out of park position within the predetermined period of time.

The above features and advantages and other features and advantages of the present disclosure are readily apparent from the following detailed description of the best modes for carrying out the disclosure when taken in connection with the accompanying drawings.

DETAILED DESCRIPTION

Figure 1:
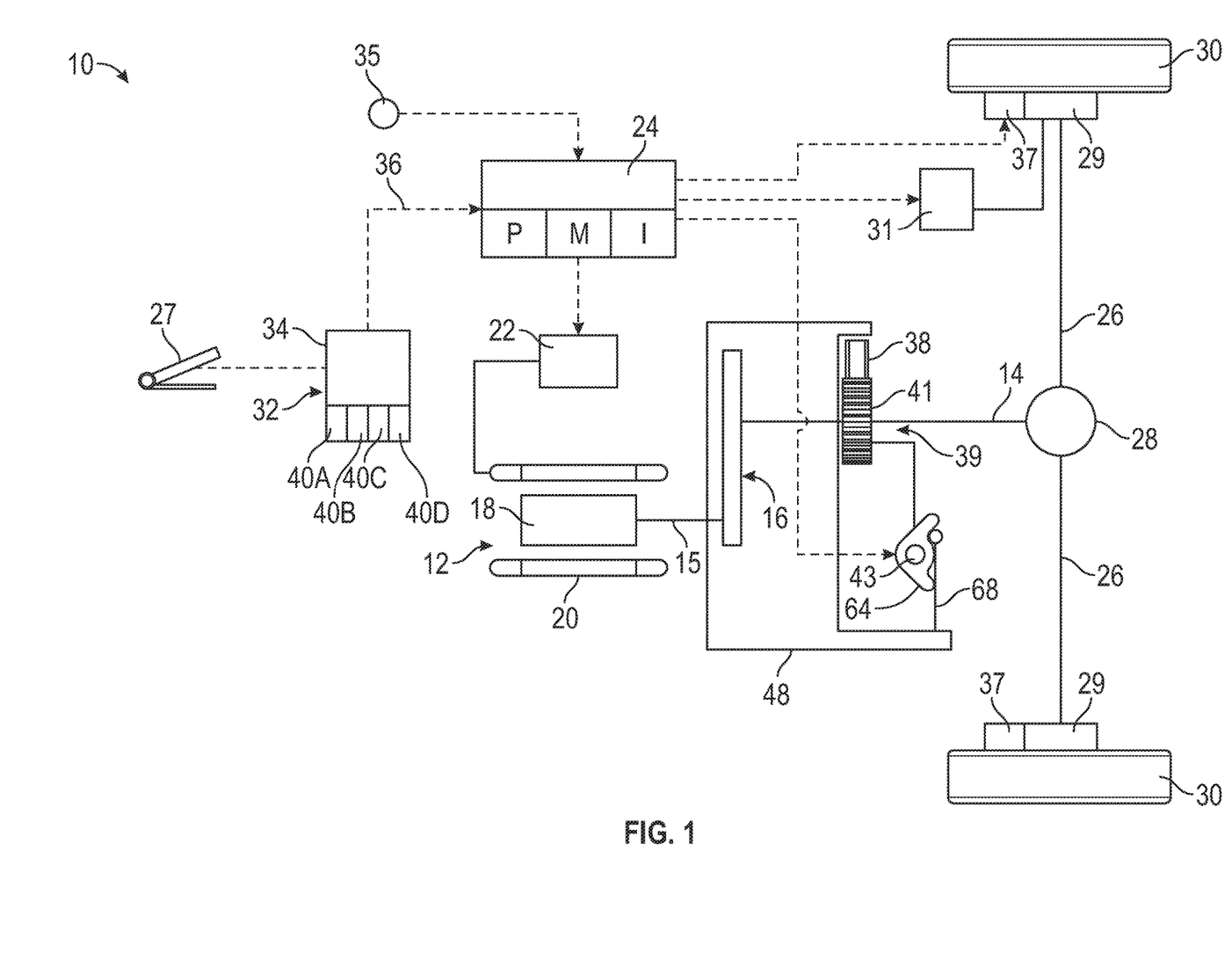
FIG. 1 is a schematic illustration of a vehicle including a park system.

Referring to the drawings, an example vehicle 10 is shown schematically in FIG. 1 having an electric propulsion motor 12 that is connectable to an output shaft 14 for providing torque to the output shaft 14. The motor 12 may be connected to the output shaft 14 indirectly, through an input shaft 15 and a gearing arrangement 16 disposed within a transmission casing 48. The gearing arrangement 16 may include a number of intermeshing gears that may be arranged as one or more planetary gear sets or otherwise, may be configured to multiply the torque provided by the motor 12 from the input shaft 15 to the output shaft 14. In some embodiments, there may be one or more selectively engageable clutches between the electric propulsion motor 12 and the output shaft 14 that must be engaged in order for the electric propulsion motor 12 to be able to provide torque to the output shaft 14. In the embodiment shown, no clutches need be engaged in order for torque to be transferred from the input shaft 15 to the output shaft 14 through the gearing arrangement 16. In another example, the input shaft 15 and the output shaft 14 are integrated as a single shaft without a gearing arrangement 16.

The motor 12 includes a rotatable rotor 18 and a stator 20 to which electrical power is provided from an energy storage device such as a battery 22 when commanded by an electronic controller 24. When the motor 12 provides torque, the rotor 18 rotates in the direction of torque, and the output shaft 14 rotates in a direction dependent upon the direction of torque. For example, if the gearing arrangement 16 reverses the direction of rotation from the input shaft 15 to the output shaft 14, then the output shaft 14 rotates in a direction opposite to the direction of torque. If the gearing arrangement does not reverse the direction of rotation, then the output shaft 14 rotates in the same direction as the input shaft 15 and the direction of torque of the motor 12. The output shaft 14 is connected to half shafts 26 through a differential 28 to power vehicle wheels 30. The half shafts 26 may be referred to as a drive axle.

The wheels 30 may be front wheels or rear wheels. The vehicle 10 has another axle with a pair of wheels that is not shown. In addition to the electric propulsion motor 12 that powers the wheels 30, the vehicle 10 may also include one or more power sources for powering the wheels 30 or the other pair of wheels (not shown). The separate power source or sources may be another electric motor (such as if the vehicle 10 is an all-electric vehicle) and/or an internal combustion engine (such as if the vehicle 10 is a hybrid vehicle). In each example embodiment, however, the motor 12 is configured to provide torque to the output shaft 14 without need of the other power source(s).

The vehicle 10 may be equipped with an Electronic Transmission Range Selection (ETRS) system 32 that enables the vehicle operator to select an operating mode or range, sometimes referred to as a "gear", such as park, reverse, neutral, and one or more drive ranges. Each range may be associated with a range of speeds, and direction of rotation of the output shaft 14. The ETRS system 32 may include an electronic range selector device 34 operatively connected to the controller 24.

The electronic range selector device 34 is operable to transmit an electronic range request signal 36 to the controller 24 to request a shift to the requested operating range. In the example described herein, the electronic range request signal 36 may be a shift out of park request signal. The controller 24 is configured, i.e., equipped in hardware and programmed in software, to execute instructions I embodying a method 200, an example of which is provided in FIG. 9. Execution of the method 200 ultimately controls a shift out of park operation (also referred to as a pull out of park operation) of the vehicle 10. The method 200 helps to ensure that a park pawl 38 of a vehicle park system 39 is moved out of engagement with a park gear 41 mounted to rotate on the output shaft 14 in a sufficiently short time, even when the vehicle 10 is parked on a grade, and by using the electric propulsion motor 12 to assist a park system actuator 43 under some operating parameters, as described herein.

The electronic range selector device 34 may include a plurality of input elements 40A, 40B, 40C, 40D. Each input element 40A, 40B, 40C, 40D corresponds to a desired operating range of the vehicle 10, e.g., a park input element 40A for park range; a reverse input element 40B for reverse range; a neutral input element 40C for neutral range; and a drive input element 40D for drive range. The input elements 40A, 40B, 40C, 40D may be actuated by the vehicle operator, and may be embodied as spring-biased buttons, as icons displayed on a touch-sensitive electronic display, as a shift lever, or otherwise.

When the vehicle 10 is in a park range, an electric braking system (EPB) 37 may be engaged to brake the vehicle wheels 30. When a driver wishes to change from the park range to one of the other operating ranges (i.e., shift out of park), the driver may: (i) place his foot on the brake (such as on brake pedal 27 of FIG. 1) causing the controller 24 to command a hydraulic system 31 to apply hydraulic pressure to a vehicle hydraulic braking system 29, and (ii) request a shift out of park such as by actuating (by depression or otherwise) one of the input elements 40B, 40C, or 40D, causing a transmission of the electronic range request signal 36 as a shift out of park request signal to the controller 24, which receives the transmitted shift out of park request signal 36.

The vehicle park system 39 includes the park pawl 38 which has teeth or splines that mate with teeth or splines of the park gear 41. The park gear 41 is mounted on and connected to rotate at the same speed as (e.g., in unison with) the output shaft 14. With reference to FIGS. 4-7, one example embodiment of the vehicle park system 39 is shown in greater detail. The park gear 41 is supported on a stationary transmission casing 48, and the output shaft 14 extends out of an opening in the casing 48. The park pawl 38 is pivotably mounted to a boss 48A of the casing 48 and pivots about pivot axis 50. As shown, the end of the park pawl 38 near the pivot axis 50 is partially within a slot in the transmission casing 48. A park pawl spring 52 mounted by a bracket 53 to a boss 48B of the casing 48 biases the park pawl 38 to a disengaged position shown in FIG. 4, in which a tooth 56 of the park pawl 38 is out of engagement with a notch 58 of the park gear 41.

The park actuator 43 is an electric motor splined to an actuator shaft 60 and configured to cause angular movement of the actuator shaft 60 about a center axis 62 of the actuator shaft 60. Stated differently, the park actuator 43 is configured to rotate the actuator shaft 60. A portion 45 of the casing 48 is shown in cross-section in FIG. 4 and surrounds the actuator 43, with the actuator shaft 60 extending out of an aperture in the portion 45. An actuator position sensor 61 is disposed on the actuator 43 and is operable to determine a rotational position of the actuator shaft 60.

Figure 4:
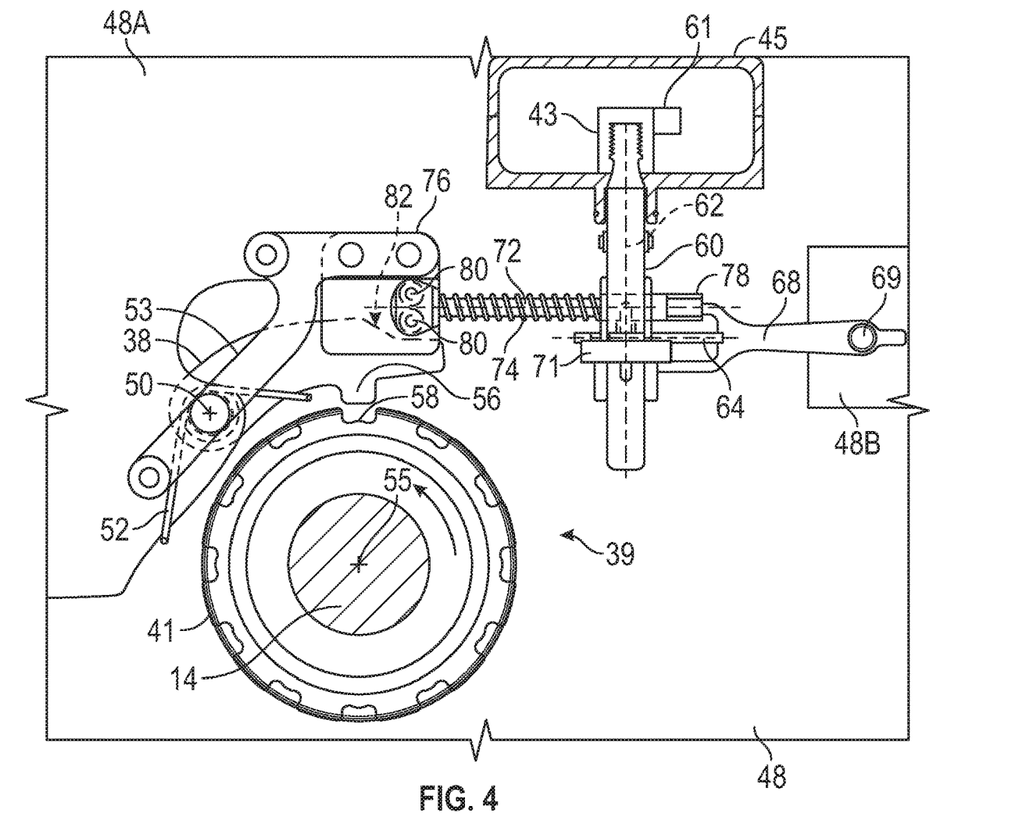
FIG. 4 is a schematic illustration in side view of the park system of the vehicle of FIG. 1 in partial fragmentary view, with a transmission output shaft in cross-sectional view, and with the park pawl in an out of park position.
Figure 5:
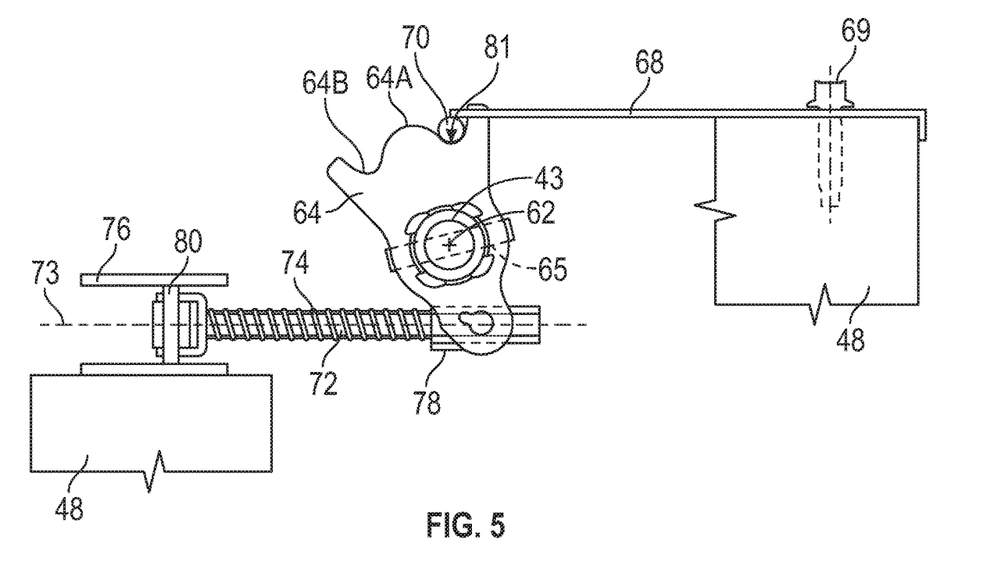
FIG. 5 is a schematic illustration of the park system of FIG. 4 in plan view.
Figure 6:
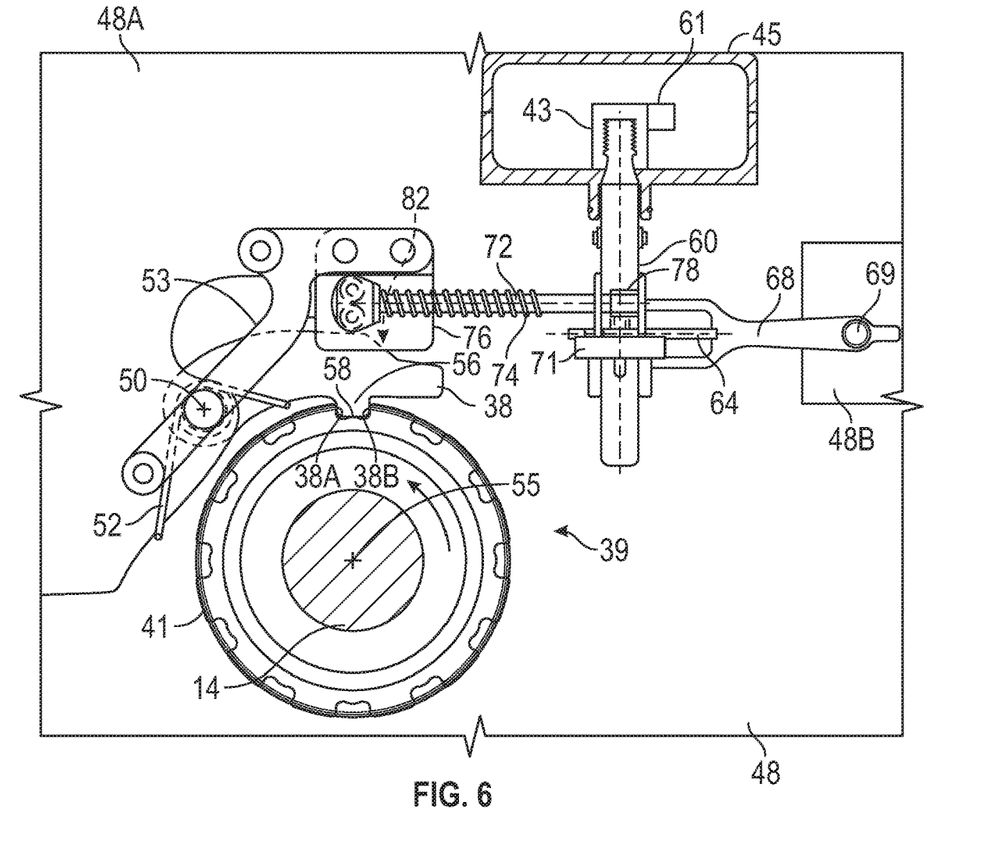
FIG. 6 is a schematic illustration in side view of a park system of FIG. 4 with the park pawl in a park position.
Figure 7:
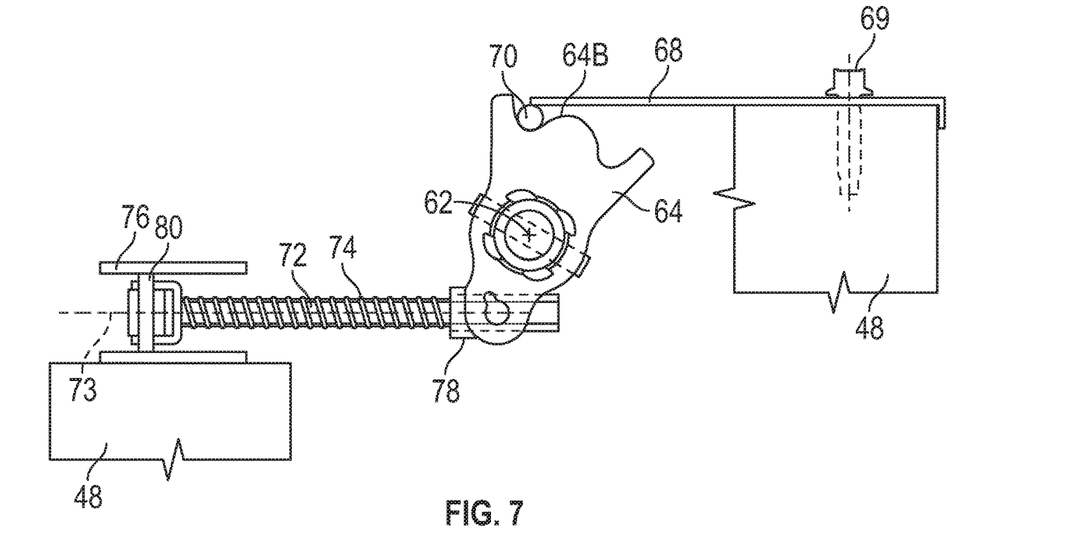
FIG. 7 is a schematic illustration of the park system of FIG. 6 in plan view.

The park system 39 also includes a detent lever 64 connected to the actuator shaft 60 by a roll pin 65. A detent spring 68 is mounted at a fixed end to the casing 48 by a bolt 69. The detent lever 64 has two detents 64A, 64B spaced approximately 45 degrees apart from one another about the axis 62. A rolling element 70 at the opposite free end of the detent spring 68 is biased by the detent spring 68 against a contoured outer surface of the detent lever 64, also referred to as a cam surface 81, such that it is moved to either the first detent 64A or the second detent 64B depending on the angular position of the shaft 60.

The park system 39 also includes a park actuator rod 72 connected to the park detent lever 64 at an opposite end, with the actuator shaft 60 extending through the park detent lever 64 between the end with the detents 64A, 64B and the end with the actuator rod 72. A compression spring 74 is concentric with the rod 72 and is captured between a roller guide 76 and an end cap 78. When the actuator 43 causes the shaft 60 to rotate, the detent lever 64 moves angularly about the axis 62 with the shaft 60, causing the spring 74 to be compressed and the rod 72 to move linearly along axis 73 orthogonal to axis 62. One or more rolling elements 80 at an end of the rod 72 captured within the roller guide 76 move along a cam surface 82 of the park pawl 38 as the rod 72 translates. For example, the rolling elements 80 may be roller bullets. Alternatively, sliding bullets may be used. The cam surface 82 is at an opposite side of the park pawl 38 from the tooth 56. Movement of the rolling elements 80 along the cam surface 82 causes the park pawl 38 to pivot about pivot axis 50, so that the tooth 56 moves from the disengaged position of FIG. 4 to the engaged position of FIG. 6 as the rod 72 moves from left to right, and vice versa. In the park position of the lever 64, the park pawl 38 is engaged with the park gear 41. In the out of park position of the lever 64, the park pawl 38 is disengaged from the park gear 41. The detent spring 68 biases the roller element 70 in one or the other of the detents 64A, 64B and together with the spring 74 biases the lever 64 to one of the park position and the out of park position (and therefore the park pawl 38 to the corresponding engaged position or disengaged position), once the position is established, until the actuator 43 rotates in the opposite direction to move the detent lever 64 and the park pawl 38 to the other position.

A transmission range sensor (TRS) 71 is mounted on the detent lever 64 such that it is operable to indicate an angular position of the detent lever 64. The TRS 71 is operable to determine if the detent lever 64 has moved towards the out of park position, and therefore the park pawl 38 is pulled out of the engaged position. The TRS 71 sends a park pawl position signal to the controller 24. The TRS 71 may be a Hall Effect sensor or another sensor for determining if the detent lever 64 has moved towards the out of park position and therefore the park pawl 38 is pulled out of the engaged position. For example, the TRS 71 may output a pulse width modulated signal that is proportional to the angular position of the park detent lever 64

Figure 2:
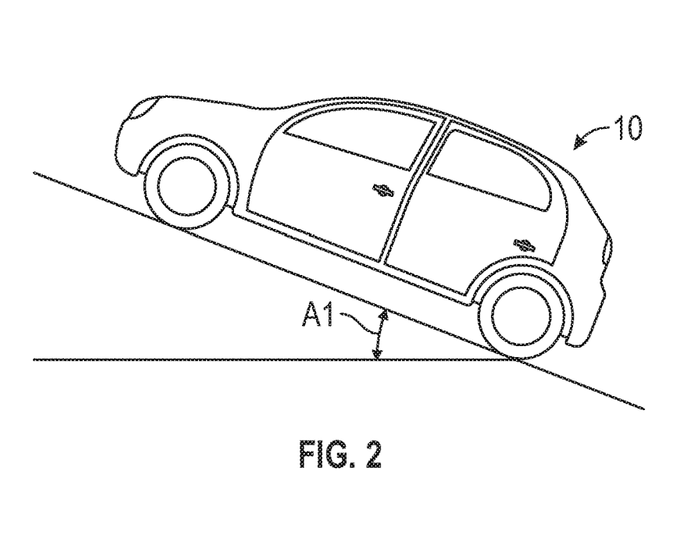
FIG. 2 is a schematic illustration of the vehicle of FIG. 1 parked on an uphill grade.
Figure 3:
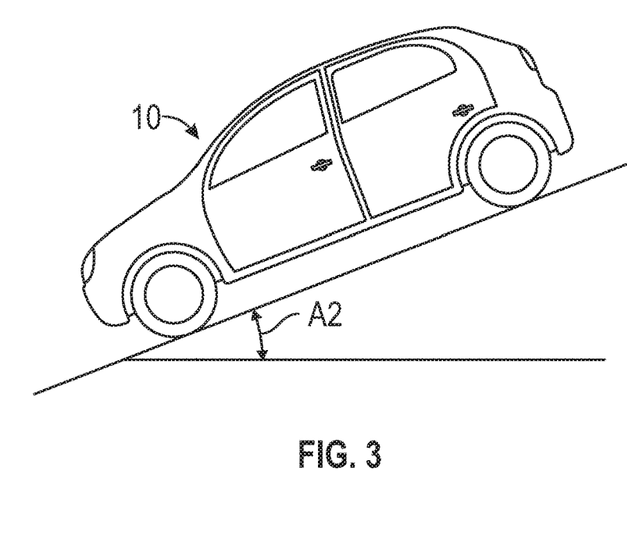
FIG. 3 is a schematic illustration of the vehicle of FIG. 1 parked on a downhill grade.

When the vehicle 10 is parked on a significant upgrade as shown in FIG. 2, or a significant downgrade as shown in FIG. 3, the wheels 30 may roll slightly after the park pawl 38 is engaged, causing the output shaft 14 to move angularly about its axis 55, with the park gear 41 also rotating with the output shaft 14 and loading the tooth 56 against the park pawl 38 in the notch 58. When parked on an upgrade, the tooth 56 will be loaded against the park gear 41 at one sidewall 38A of the gear 41 at the notch 58, and when parked on a downgrade, the tooth 56 will be loaded against the park gear 41 at the opposite sidewall 38B of the park gear 41 at the notch 58. The grades are represented by angles A1 and A2 in FIGS. 2 and 3. The magnitude of the load on the tooth 56 is a function of the grade and of the gross vehicle weight of the vehicle 10. A sensor in the propulsion motor 12 can indicate the direction of vehicle roll when the vehicle 10 is shifted to park, and, in one example of the method 200 described herein, this information can be stored in the controller 24 for use in estimating the grade during a subsequent shift out of park. Additionally or alternatively, an inertial measurement unit sensor 35 disposed on the vehicle 10, such as in a safety module of the vehicle 10, can indicate changes in longitudinal or angular acceleration of the vehicle 10 by a signal to the controller 24, which is indicative of and may be used in estimating the grade according to the method 200.

In order for the actuator 43 to overcome the load on the tooth 56 of the park pawl 38 caused by the grade and move the tooth 56 away from the park gear 41 in the notch 58 (i.e., out of contact with the sidewall 38A or 38B), the actuator 43 would need to be able to provide sufficient torque to move the shaft 60, or would need to be assisted in some manner. The torque available from the actuator 43 is dependent upon the size of the electric motor in the actuator 43. The torque available from the actuator 43 alone may be determined to be sufficient to move the park pawl 38 at grades at or below a predetermined grade, such as at or below 7 percent upgrade or downgrade.

Figure 8:
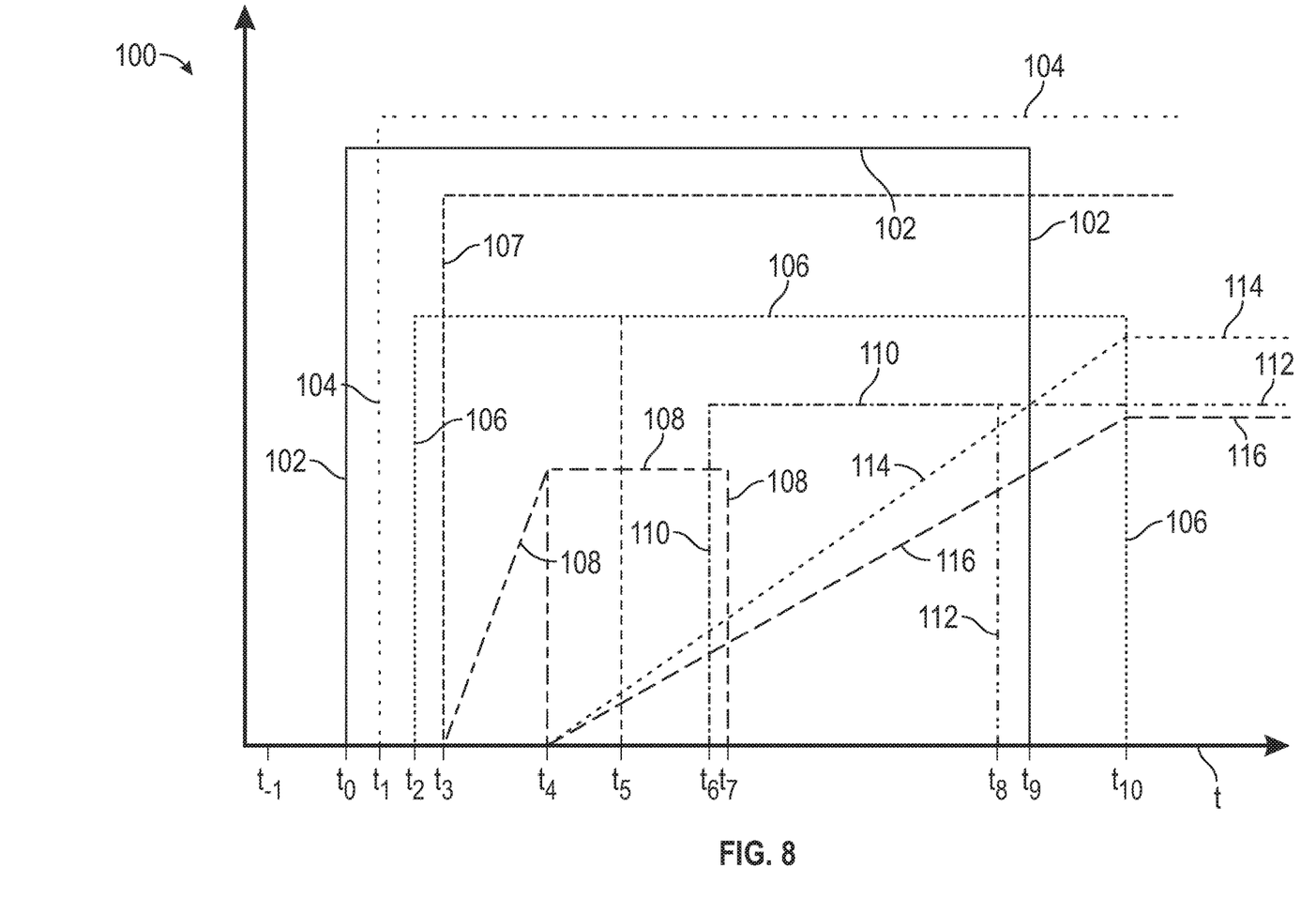
FIG. 8 is an example plot of electronic signal parameters versus time during a shift out of park event of the vehicle of FIG. 1 according to the method of FIG. 9.
Figure 9:
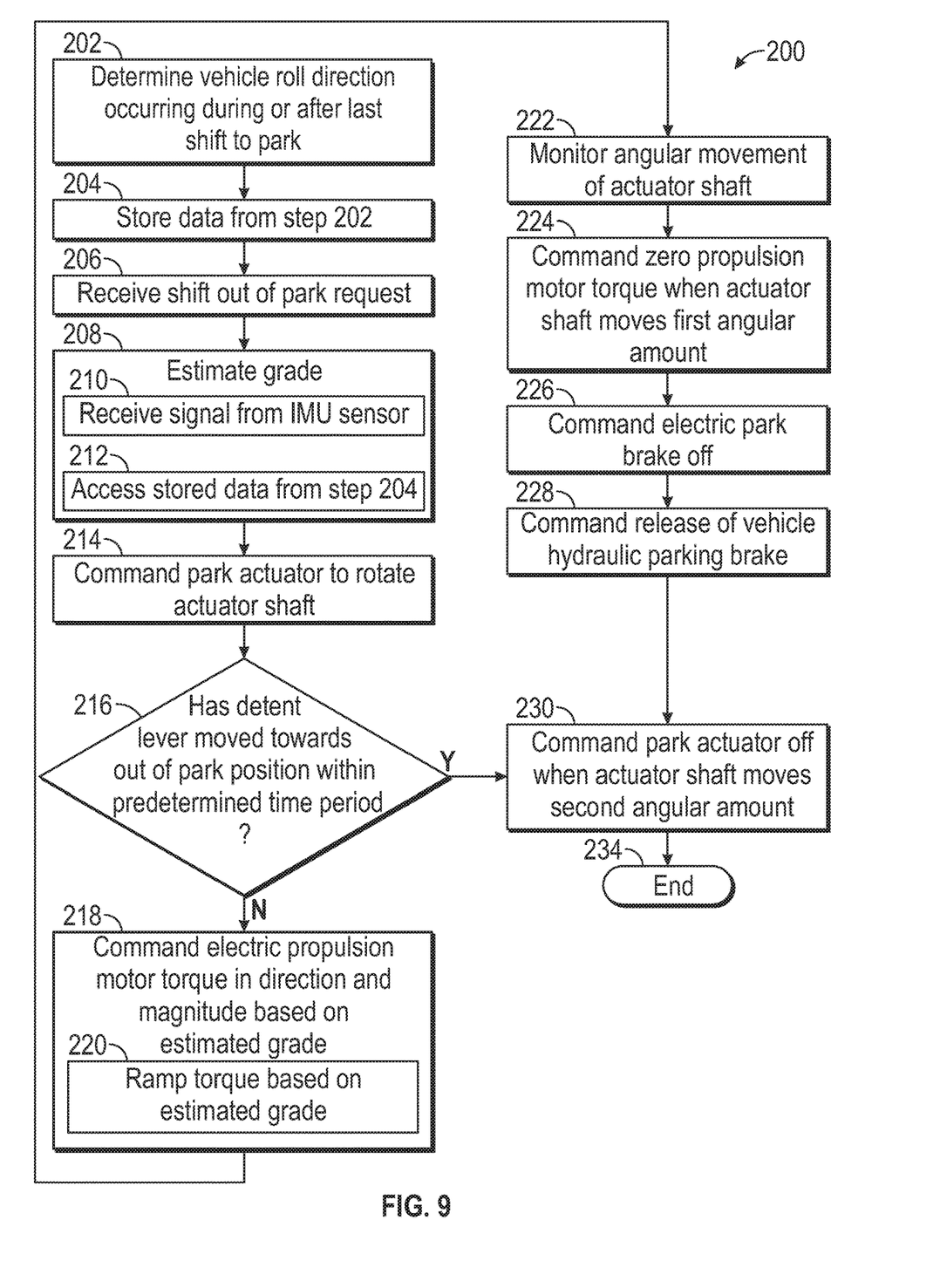
FIG. 9 is a flow diagram of a method of controlling a shift out of park of the vehicle of FIG. 1.

To ensure that a shift out of park occurs within a predetermined period of time and without jerkiness, the vehicle 10, including the park system 39, is controlled by the controller 24 according to a method 200 that is set forth in the flow diagram of FIG. 9. The plot 100 of FIG. 8 is referenced in explaining the sequence and steps of the method 200.

The controller 24 of FIG. 1 may be embodied as a computer device, or multiple such devices, each having one or more processors P and memory M. The memory includes sufficient amounts of tangible, non-transitory memory, e.g., optical or magnetic read only memory (ROM), erasable electrically-programmable read only memory (EEPROM), flash memory, and the like, as well as transient memory such as random-access memory (RAM). The controller 24 may also include a high-speed clock, analog-to-digital (A/D) circuitry, digital-to-analog (D/A) circuitry, any required input/output (I/O) circuitry and devices, and signal conditioning/buffering/filtering electronics.

Individual control algorithms resident in the controller 24 or readily accessible thereby, such as instructions I embodying the method 200 of FIG. 9, may be stored in memory and automatically executed via the processor to provide the respective control functionality. Possible control actions resulting from execution of the method 200 are described in detail below.

Referring now to FIG. 8, a schematic plot 100 shows a shift out of park operation of the vehicle 10 according to the method 200 of FIG. 9. The plot 100 includes a shift out of park operation, defined as removal of the park pawl 38 of FIG. 1 from the park position. Time t is schematically depicted on the horizontal axis. Magnitudes of electronic signal 102, 104, 106, 108, 110, 112, 114, and 116 are schematically depicted on the vertical axis. For example, the magnitudes may be voltages of the signals. In the plot 100, a "Y" indicates that the controller 24 has determined an affirmative answer to the query of the associated step, and "N" indicates that the controller has determined a negative answer.

In certain embodiments, the method 200 begins with steps even before a driver requests a shift out of park. Namely, the method 200 may gather data during an immediately preceding shift to park (resulting in the current park state of the vehicle 10) in step 202 by determining vehicle roll direction occurring during or after a last shift to park event. For example, the rotational direction and speed of the electric propulsion motor 12 after the park pawl 38 is engaged with the park gear 41 in the last preceding shift to park event is indicative of vehicle roll direction and the vehicle loading of the tooth 56 of the park pawl 38 as a result of vehicle grade, and hence the direction of torque required to unload the park pawl 38. In step 204, the data determined in step 202 is stored in memory M. Because these steps occur before the request for a shift out of park, the time at which steps 202 and 204 occur may be indicated at time in FIG. 8.

The method 200 includes step 206, which occurs after steps 202 and 204 if steps 202 and 204 are included. In step 206, the controller 24 receives a shift out of park request. This may be indicated by a signal 102 at time to in FIG. 8, corresponding to the driver depressing the brake pedal 27 (as conveyed by a position sensor on the brake pedal), and by a signal 104 at time $t_1$ corresponding to the driver actuating one of the input elements 40B, 40C, 40D corresponding with a range other than park. In other embodiments, as explained herein, the method 200 does not include steps 202 and 204, and instead begins at step 206.

Following step 206, the method 200 proceeds to step 208, in which the controller 24 estimates a grade on which the vehicle is parked. Step 208 may include substep 210, receiving a signal from the IMU sensor 35, as the magnitude and direction of the grade may be estimated based on an inertial measurement unit sensor signal. The inertial measurement unit sensor signal is indicative of the direction of grade (i.e., whether the vehicle 10 is parked on a downgrade with the front wheels downhill of the rear wheels or on an upgrade with the front wheels uphill of the rear wheels). As an alternative to substep 210, step 208 may include substep 212, accessing stored data on vehicle roll direction (e.g., rotational direction and speed of the propulsion motor 12) from steps 202 and 204.

Next, in step 214, the controller 24 commands the park actuator 43 to rotate the actuator shaft 60, as indicated by command signal 106 at time $t_2$ in FIG. 8. The method 200 then proceeds to step 216, in which the controller 24 determines whether the detent lever 64 has moved towards the out of park position within a predetermined period of time after commanding the park actuator 43 to rotate the actuator shaft 60. For example, based on the actuator position sensor 61 and a current sensor in the actuator 43, the controller 24 determines at time $t_3$ whether, within a predetermined period of time (the difference between time $t_3$ and time $t_2$), the actuator 43 has moved the detent lever 64 sufficiently so that the detent lever 64 has moved towards the out of park position, and the park pawl 38 has therefore moved away from the engaged position, Movement of the park pawl 38 away from the engaged position may mean away from the sidewall (38A or 38B, dependent upon the grade), but not necessarily out of the notch 58 or completely to the disengaged position. If the detent lever 64 has moved towards the out of park position within the predetermined time period under step 216, then the electric propulsion motor 12 is not needed to shift out of park, and the method 200 skips to step 226. Stated differently, the torque provided by the actuator 43 alone is sufficient without assistance from the electric propulsion motor 12 if the query of step 216 is satisfied.

However, if the detent lever 64 has not moved towards the out of park position within the predetermined time period under step 216, then the method 200 moves to step 218, and the controller 24 commands the electric propulsion motor 12 to apply torque to the transmission output shaft 14 to assist the park actuator 43 with unloading the park pawl 38, including commanding a direction of torque and a magnitude of torque based on the grade as estimated in step 208. The propulsion motor torque command signal 108 at time $t_3$ of FIG. 8 indicates the command of step 218 for the electric motor 12 to apply torque. Also, at time $t_3$, the controller 24 commands vehicle brake pressure, as indicated by line 107, so that the wheels 30 are held stationary as the propulsion motor torque is applied to the output shaft 14 during the shift out of park.

Step 218 may include substep 220, ramping the torque of the electric propulsion motor 12 applied to the output shaft 14 up to the magnitude of torque based on the grade as estimated. In FIG. 8, the ramping is indicated by the increasing magnitude of the propulsion motor torque command signal 108, which may be a voltage magnitude, and which reaches a constant level at time $t_4$. The constant level is the level correlated with the torque magnitude based on the estimated grade and is limited to the value when initial angular movement of the actuator shaft 60 is detected. The ramping prevents abrupt shift out of park which could result in an uneven shift feel. During the shift out of park event, at least until time $t_{10}$ in FIG. 8, the rotational speed of the output shaft 14 remains at zero.

The method 200 continues at step 222, in which the controller 24 monitors angular movement of the actuator shaft 60, and then in step 224 commands zero torque of the electric propulsion motor 12 so that it no longer applies torque to the transmission output shaft 14 when the actuator shaft 60 has moved a first predetermined angular amount. It should be appreciated that monitoring angular movement of the actuator shaft 60 herein may be by monitoring angular movement of the park detent lever 64, as the park detent lever 64 is fixed for movement with the actuator shaft 60 by the roll pin 65, and the actuator shaft 60 and the park detent lever 64 therefore move angularly in unison.

Monitoring the angular movement of the actuator shaft 60 may be accomplished by (i) the park actuator position sensor 61 and by the TRS 71, (ii) two park switches, or both. The signal of the park actuator position sensor 61 is indicated as 114 in FIG. 8. The signal of the TRS 71 is indicated as 116 in FIG. 8. The signal of the alternative of additional park switches are shown as a first park switch signal 110 and a second park switch signal 112 in FIG. 8. If the sensors 61, 71 are used, their signals 114, 116 begin at time $t_4$, as rotation of the actuator shaft 60 begins as soon as the propulsion motor 12 is commanded on. If park switches are used, the first park switch signal 110 begins at time $t_6$, when the actuator shaft 60 has moved a first angular amount, such as 5 degrees, which may be enough to unload the park pawl 38. The values of the sensor signals 114, 116 at time $t_6$ are indicative to the controller 24 that the actuator shaft 60 has moved a first angular amount, in the embodiments in which the sensors 61, 71 are used instead of park switches.

In either case, following the indication by the first park switch or by the sensors 61, 71 at time $t_6$, at time $t_7$, the propulsion motor torque command signal 108 is commanded to zero torque, as the actuator 43 alone can now complete movement of the park pawl 38 to the disengaged position.

At time $t_8$, the actuator shaft has moved a second angular amount, as indicated either by the second park switch signal 112 or, in embodiments in which the sensors 61, 71 are used instead of the park switches, by the values of the signals 114, 116 at time $t_8$. The second angular amount may be, for example, 45 degrees, which may correspond with the park detent lever in the out of park position of FIG. 5, and the park pawl 38 in the disengaged position of FIG. 4.

Once the detent lever 64 is in the out of park position, the park pawl 38 is in the disengaged position, and the method 200 may further include step 226, commanding release of the electronic parking brake, if on. The electronic park brake may or may not have been on while unloading and disengagement of the park pawl 38, as the method 200 may be carried out even in the event the EPB system 37 is not operating. Next, in step 228, the driver takes his foot off of the brake pedal 27, as indicated at time $t_9$ by the command signal 102 falling to off (e.g., zero volts).

The method 200 may proceed to step 230, in which the controller 24 commands the park actuator 43 off as indicated at time $t_{10}$, as the actuator shaft 60 has moved a second predetermined angular amount corresponding with the out of park position of the detent lever 64 and the disengaged position of the park pawl 38, and the park actuator rod 72 has completed its stroke to move the detent lever 64 to the disengaged position. The second predetermined angular amount is greater than the first predetermined angular amount. For example, the first predetermined angular amount may be but is not limited to 5 degrees, and the second predetermined angular amount may be but is not limited to 45 degrees.

With the park pawl 38 in the disengaged position and the hydraulic brake system 29 and the EPB system 37 released, the method ends at box 234, and the vehicle 10 can proceed to be operated in the out of park range to which it was shifted under the method 200. Accordingly, because the electric propulsion motor 12 assists the park actuator 43 to unload the park pawl 38 when the park actuator 43 is unable to do so on its own within a sufficient time period, such as when the vehicle 10 is on a grade contributing to loading of the park pawl 38 creating a larger torque than is available from the park actuator 43, the park actuator 43 need not be sized for a worst case loading situation (for example, a loading situation when the vehicle 10 is at its maximum gross vehicle weight and is on a 30 percent grade). Instead, the park actuator 43 may be sized for providing a maximum torque correlated with much lower loading, relying on the propulsion motor 12 to provide the additional torque needed, thereby saving packaging space, and reducing the number of different actuators needed across different vehicle platforms.

While the best modes for carrying out the disclosure have been described in detail, those familiar with the art to which this disclosure relates will recognize various alternative designs and embodiments for practicing the disclosure within the scope of the appended claims.

What is claimed is:

1. A method of controlling a vehicle park system of a vehicle having an electric propulsion motor connectable with a transmission output shaft, the method comprising:
   receiving, via an electronic controller, a shift out of park request;
   commanding, via the electronic controller, a park actuator to rotate an actuator shaft; wherein a detent lever is mounted on the actuator shaft and is operatively connected to a park pawl; wherein the detent lever is movable from a park position in which the park pawl is engaged with a park gear mounted on the transmission output shaft, to an out of park position in which the park pawl is disengaged from the park gear;
   determining whether the detent lever has moved towards the out of park position within a predetermined period of time after commanding the park actuator to rotate the actuator shaft; and
   commanding the electric propulsion motor to apply torque to the transmission output shaft to assist the park actuator with unloading the park pawl if the detent lever has not moved toward the out of park position within the predetermined period of time.

2. The method of claim 1, further comprising:
   estimating a grade on which the vehicle is parked;
   wherein commanding the electric propulsion motor to apply torque to the transmission output shaft includes commanding a direction of torque and a magnitude of torque based on the grade as estimated.

3. The method of claim 2, wherein the vehicle has an inertial measurement unit sensor, and wherein estimating the grade is at least partially based on a signal from the inertial measurement unit sensor.

4. The method of claim 2, wherein the estimating the grade includes:
accessing stored data indicative of a direction of vehicle roll occurring during or after a last preceding shift to park event.

5. The method of claim 4, further comprising:
determining rotational direction and speed of rotation of the electric propulsion motor after the park pawl is engaged with the park gear in the last preceding shift to park event; and
storing the rotational direction and speed of rotation as the data indicative of the direction of vehicle roll occurring during the last preceding shift to park event.

6. The method of claim 2, wherein commanding the electric propulsion motor to apply the torque to the output shaft includes ramping the torque applied to the output shaft up to the magnitude of torque based on the grade as estimated.

7. The method of claim 1, further comprising:
monitoring angular movement of the actuator shaft; and
commanding zero torque of the electric propulsion motor when the actuator shaft has moved a first predetermined angular amount.

8. The method of claim 7, further comprising:
commanding the park actuator off when the actuator shaft has moved a second predetermined angular amount corresponding with the disengaged position of the park pawl; wherein the second predetermined angular amount is greater than the first predetermined angular amount.

9. The method of claim 8, further comprising:
commanding release of vehicle brake hydraulic pressure.

10. The method of claim 8, further comprising:
commanding release of an electronic parking brake.

11. A vehicle park system for a vehicle having an electric propulsion motor connectable with a transmission output shaft, the vehicle park system comprising:
a park gear mounted on the transmission output shaft;
a park pawl movable from an engaged position in which the park pawl is engaged with the park gear to a disengaged position in which the park pawl is disengaged from the park gear;
a park actuator having an actuator shaft;
a detent lever mounted on the actuator shaft and operatively connected to the park pawl;
wherein the park actuator is configured to rotate the actuator shaft to move the detent lever from a park position in which the park pawl is in the engaged position, to an out of park position in which the park pawl is in the disengaged position;
an electronic controller operatively connected to the electric propulsion motor and the park actuator, and, in response to receiving a shift out-of-park request, configured to:
command the park actuator to rotate the actuator shaft;
determine whether the detent lever has moved towards the out of park position within a predetermined period of time after commanding the park actuator to rotate the actuator shaft; and
command the electric propulsion motor to apply torque to the transmission output shaft to assist the park actuator with unloading the park pawl if the detent lever has not moved towards the out of park position within the predetermined period of time.

12. The vehicle park system of claim 11, wherein the electronic controller is configured to estimate a grade on which the vehicle is parked, and command the electric propulsion motor to apply the torque to the output shaft in a direction and magnitude based on the grade as estimated.

13. The vehicle park system of claim 12, wherein the vehicle has an inertial measurement unit sensor; and wherein the electronic controller is configured to estimate the grade based on a signal from the inertial measurement unit sensor.

14. The vehicle park system of claim 12, wherein the electronic controller is configured to store data indicative of a direction of vehicle roll occurring during or after a last preceding shift to park event, and estimate the grade based on the stored data.

15. The vehicle park system of claim 14, wherein the electronic controller is configured to:
determine rotational direction and speed of rotation of the electric propulsion motor after the park pawl is engaged with the park gear in the last preceding shift to park event; and
store the rotational direction and speed of rotation as the data indicative of the direction of vehicle roll occurring during the last preceding shift to park event.

16. The vehicle park system of claim 12, wherein the controller is configured to ramp the torque applied to the output shaft up to the magnitude of torque based on the grade as estimated.

17. The vehicle park system of claim 12, wherein the electronic controller is configured to:
monitor angular movement of the actuator shaft; and
command zero torque of the electric propulsion motor when the actuator has moved a first predetermined angular amount.

18. The vehicle park system of claim 17, wherein the electronic controller is configured to:
command the park actuator off when the actuator shaft has moved a second predetermined angular amount corresponding with the disengaged position of the park pawl; wherein the second predetermined angular amount is greater than the first predetermined angular amount.

19. The vehicle park system of claim 18, wherein the vehicle includes a wheel and a braking system including a hydraulically-engaged vehicle brake configured to brake the wheel, and wherein the electronic controller is configured to:
command release of hydraulic pressure to the vehicle brake after the actuator shaft has moved the second predetermined angular amount.

20. The vehicle park system of claim 18, wherein the vehicle includes a wheel, a hydraulic braking system and an electronic parking brake both configured to brake the wheel; and wherein the electronic controller is configured to:
command release of vehicle brake hydraulic pressure and release of the electronic parking brake after the actuator shaft has moved the second predetermined angular amount.

* * * * *